(12) United States Patent
Teramae et al.

(10) Patent No.: US 10,413,961 B2
(45) Date of Patent: Sep. 17, 2019

(54) METHOD FOR MANUFACTURING CYLINDRICAL MEMBER

(71) Applicant: MITSUBISHI HEAVY INDUSTRIES, LTD., Tokyo (JP)

(72) Inventors: Takuma Teramae, Tokyo (JP); Shuho Tsubota, Tokyo (JP); Seiji Fukumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 4 days.

(21) Appl. No.: 15/500,287

(22) PCT Filed: Sep. 15, 2015

(86) PCT No.: PCT/JP2015/076193
§ 371 (c)(1),
(2) Date: Jan. 30, 2017

(87) PCT Pub. No.: WO2016/067779
PCT Pub. Date: May 6, 2016

(65) Prior Publication Data
US 2017/0225220 A1    Aug. 10, 2017

(30) Foreign Application Priority Data

Oct. 31, 2014 (JP) .................................. 2014-223493

(51) Int. Cl.
*B21D 53/16* (2006.01)
*B21D 51/18* (2006.01)
(Continued)

(52) U.S. Cl.
CPC ............. *B21D 53/16* (2013.01); *B21D 5/015* (2013.01); *B21D 5/12* (2013.01); *B21D 51/18* (2013.01);
(Continued)

(58) Field of Classification Search
CPC ...... B21D 19/12; B21D 19/043; B21D 21/00; B21D 35/001; B21D 35/002; B21D 39/02; B21D 39/03; B21D 53/16
See application file for complete search history.

(56) References Cited

FOREIGN PATENT DOCUMENTS

JP    56-168972 A    12/1981
JP    59-76690 A    5/1984
(Continued)

OTHER PUBLICATIONS

Machine translation of JP 56-168972, Miyazaki, pp. 1-2, translated on Mar. 28, 2018.*
(Continued)

*Primary Examiner* — Teresa M Ekiert
(74) *Attorney, Agent, or Firm* — Westerman, Hattori, Daniels & Adrian, LLP (57) ABSTRACT

Provided is a method for manufacturing a cylindrical member which includes end bending of respective end portions of a plate material in a longitudinal direction, primary grooving of respective end surfaces of the plate material subjected to end bending, bending of the plate material to a ring shape, secondary grooving of respective end surfaces of the plate material subjected to bending in a ring shape, and joining of respective end surfaces of the plate material. Therefore, it is possible to manufacture a high-quality cylindrical member.

4 Claims, 6 Drawing Sheets

(51) Int. Cl.
*B23K 15/00* (2006.01)
*B23K 31/00* (2006.01)
*B21D 5/01* (2006.01)
*B21D 5/12* (2006.01)
*G21C 5/00* (2006.01)
*G21C 5/10* (2006.01)
*G21C 13/02* (2006.01)

(52) U.S. Cl.
CPC ............... *B23K 15/00* (2013.01); *B23K 31/00* (2013.01); *G21C 5/00* (2013.01); *G21C 5/10* (2013.01); *G21C 13/02* (2013.01)

(56) References Cited

FOREIGN PATENT DOCUMENTS

| | | |
|---|---|---|
| JP | 11-156440 A | 6/1999 |
| JP | 2001-108778 A | 4/2001 |
| JP | 2002-11535 A | 1/2002 |
| JP | 2003-191011 A | 7/2003 |
| JP | 2003-311466 A | 11/2003 |

OTHER PUBLICATIONS

International Search Report dated Nov. 17, 2015, issued in counterpart of International Application No. PCT/JP2015/076193 (2 pages).
Translation of Written Opinion dated Nov. 17, 2015, issued in counterpart International Application No. PCT/JP2015/076193. (4 pages).

* cited by examiner

METHOD FOR MANUFACTURING CYLINDRICAL MEMBER

FIELD

The present invention relates to a method for manufacturing a cylindrical member applied as, for example, a core barrel inside a nuclear reactor.

BACKGROUND

For example, a pressurized water reactor in a nuclear power plant uses light water as nuclear reactor coolant and neutron moderator, makes the light water be high-temperature and high-pressure water not boiling over through the entirety of a reactor internal, generates steam through heat exchange by sending the high-temperature and high-pressure water to a steam generator, and generates electricity by sending the steam to a turbine generator.

In the pressurized water reactor, a reactor internal is provided in a nuclear reactor vessel and the reactor internal is constituted of a plurality of fuel assemblies. In other words, in the nuclear reactor vessel, a core barrel having a cylindrical shape is arranged with a predetermined gap from the inner wall surface thereof. The upper portion of the core barrel is supported to be suspended from the nuclear reactor vessel and a plurality of fuel assemblies are arranged in the core barrel. An example of such a nuclear reactor vessel is disclosed in Patent Literature 1 described below.

CITATION LIST

Patent Literature

Patent Literature 1: Japanese Laid-open Patent Publication No. 2001-108778

SUMMARY

Technical Problem

The core barrel arranged in the nuclear reactor vessel has a cylindrical shape and a plurality of fuel assemblies constituting the reactor internal are arranged in the core barrel. The core barrel is produced using a plate material of a predetermined thickness to prevent leakage of radioactive rays or the likes. In a related art, a plate material of a predetermined length is formed into a ring shape by roller bending and end portions of the plate material are joined by welding, in such a manner that the core barrel is formed in a cylindrical shape.

However, although the core barrel is produced by making a thick plate material be formed into a ring shape by roller bending and joining the end portions by welding, the joining surface of each end portion deforms when the thick plate material is subjected to roller bending, and thus it is difficult to perform highly accurate joining when end portions of the thick plate material are joined by, particularly, electron-beam welding.

The present invention is made to solve the problem described above. An object of the present invention is to provide a method for manufacturing a cylindrical member capable of manufacturing a high-quality cylindrical member.

Solution to Problem

A method for manufacturing a cylindrical member of the present invention for solving the problem described above includes end bending of respective end portions of a plate material in a longitudinal direction, primary grooving of respective end surfaces of the plate material subjected to end bending, bending of the plate material to a ring shape, secondary grooving of respective end surfaces of the plate material subjected to bending in a ring shape, and joining of respective end portions of the plate material.

Therefore, first, each end portion of the plate material is subjected to end bending, and then each end surface is subjected to primary grooving. Next, the plate material is subjected to bending so as to have a ring shape, and then each end surface is subjected to secondary grooving. Next, end portions of the plate material are joined to each other. Thus, the length of the plate material is adjusted by primary grooving and the degree of parallelization of each end surface is adjusted by secondary grooving, and thus the end portions of the plate material can be appropriately joined to each other. As a result, the deformation of the joining surface of each end portion is prevented in the plate material and the end portions can be highly accurately joined to each other, and thus a high-quality cylindrical member can be manufactured.

In the method for manufacturing a cylindrical member of the present invention, each end surface of the plate material subjected to end bending is removed by a predetermined length in primary grooving.

Therefore, generally, the preliminary length is secured for the plate material and it is possible to easily adjust the length of the plate material by removing each end surface of the plate material by a predetermined length through primary grooving.

In the method for manufacturing a cylindrical member of the present invention, the respective end surfaces of the plate material are processed to be parallel in secondary grooving.

Therefore, the end surfaces are arranged to be parallel to each other by secondary grooving after bending is performed, in such a manner that the end portions of the plate material can be highly accurately joined to each other.

In the method for manufacturing a cylindrical member of the present invention, the respective end surfaces of the plate material are processed to be parallel on the basis of an inner circumference length and an outer circumference length of the plate material subjected to bending in a ring shape, in secondary grooving.

Therefore, it is possible to perform highly accurate secondary grooving.

In the method for manufacturing a cylindrical member of the present invention, the respective end portions of the plate material are joined by electron beam welding.

Therefore, welding can be performed to a deep position in a narrow range in the vicinity of the joining portion of the plate material, and thus it is possible to reduce the welding distortion and perform highly accurate joining of the plate material.

Advantageous Effects of Invention

According to the method for manufacturing the cylindrical member of the present invention, each end surface is subjected to primary grooving after each end portion of the plate material is subjected to end bending and each end surface is subjected to secondary grooving after the plate material is subjected to bending so as to have a ring shape, and then end portions of the plate material are joined to each other. Therefore, the deformation of the joining surface of each end portion is prevented in the plate material and the

DESCRIPTION OF EMBODIMENTS

Hereinafter, the detail of a preferred embodiment of a method for manufacturing a cylindrical member according to the present invention will be described with reference to the accompanying drawings. Further, the present invention is not limited by the embodiment, and in a case where there are a plurality of embodiments, the present invention also includes a combination of the embodiments.

Although not illustrated, a nuclear power plant has a nuclear reactor and a steam generator which are arranged in a containment and steam turbine generating equipment. A nuclear reactor according to the embodiment is a Pressurized Water Reactor (PWR) which uses light water as nuclear reactor coolant and neutron moderator, makes the light water be high-temperature and high-pressure water not boiling over through the entirety of a reactor internal, generates steam through heat exchange by sending the high-temperature and high-pressure water to a steam generator, and generates electricity by sending the steam to a turbine generator.

The nuclear reactor heats primary cooling water by the nuclear fission of fuel and the steam generator performs heat exchange between the high-temperature and high-pressure primary cooling water and secondary cooling water and generates high-pressure steam. The steam turbine generator generates electricity by driving the steam turbine using the steam. The steam driving the steam turbine is cooled by a condenser and becomes condensed water, and then the water returns to the steam generator.

Figure 10:
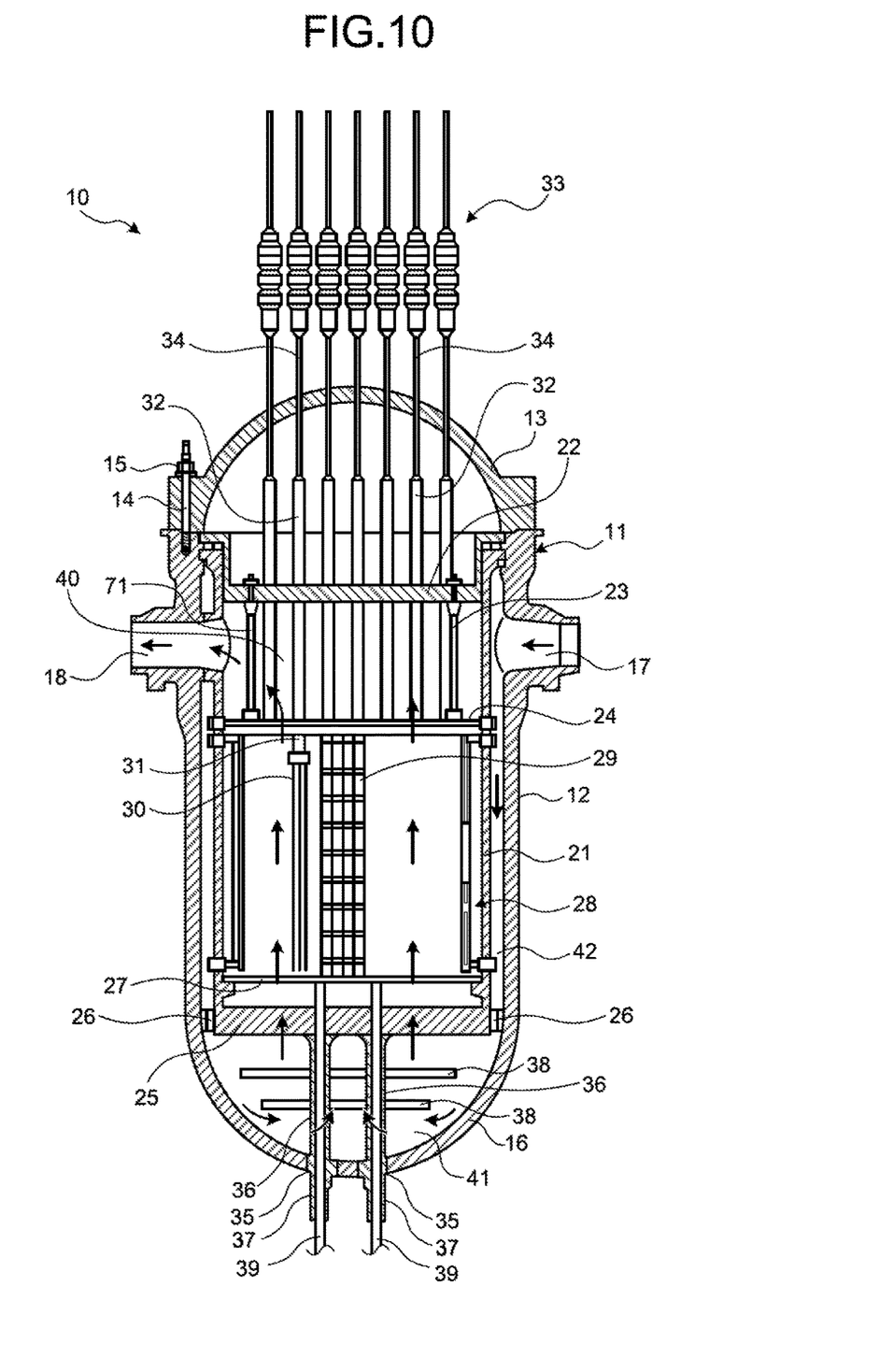
FIG. 10 is a longitudinal cross-sectional view illustrating a pressurized water reactor.

The nuclear reactor will be described. FIG. 10 is a longitudinal cross-sectional view illustrating a pressurized water reactor.

As illustrated in FIG. 10, in a pressurized water reactor 10, a nuclear reactor vessel 11 is constituted of a nuclear reactor vessel body 12 and a nuclear reactor vessel lid (an upper mirror) 13 mounted on the upper portion of the nuclear reactor vessel body 12 such that the reactor internal structure can be inserted in the nuclear reactor vessel 11. The nuclear reactor vessel lid 13 is openably fixed to the nuclear reactor vessel body 12 by a plurality of studs 14 and nuts 15.

The upper portion of the nuclear reactor vessel body 12 can be open by removing the nuclear reactor vessel lid 13 and has a cylindrical shape of which the lower portion is closed by a lower mirror 16 of a hemispherical shape. An inlet nozzle (an inlet nozzle stand) 17 for supplying light water (coolant) as primary cooling water and an outlet nozzle (an outlet nozzle stand) 18 for discharging the light water are formed in the upper portion of the nuclear reactor vessel body 12.

A core barrel 21 having a cylindrical shape is arranged in the nuclear reactor vessel body 12 with a predetermined gap from the inner wall surface thereof. The upper portion of the core barrel 21 is supported further on the upper side than the inlet nozzle 17 and the outlet nozzle 18 by the inner wall surface of the nuclear reactor vessel body 12. In addition, in the nuclear reactor vessel body 12, an upper core support plate 22 is disposed further on an upper side than the inlet nozzle 17 and the outlet nozzle 18. The upper portion of the upper core support plate 22 is supported by the upper portion of the core barrel 21. In the lower portion of the upper core support plate 22, an upper core plate 24 is suspended and supported by a plurality of core support rods 23. The upper core plate 24 has a circular plate shape and a plurality of flow holes (not illustrated) are formed in the upper core plate 24.

Furthermore, in the core barrel 21, a lover core support plate 25 is supported at a position in the vicinity of the lower mirror 16 on the lower side. The lower core support plate 25 has a circular plate shape and a plurality of flow holes (not illustrated) are formed in the lower core support plate 25. The outer peripheral portion of the lower core support plate 25 is positioned and supported on the inner wall surface of the nuclear reactor vessel body 12 by a positioning member 26. The positioning members 26 are constituted of a plurality of radial keys (not illustrated) which are fixed to the outer peripheral surface of the lower core support plate 25 at predetermined intervals along a circumferential direction and a plurality of radial key supports (not illustrated) which are fixed to the inner wall surface of the nuclear reactor vessel body 12 at predetermined intervals along the circumferential direction.

In the lower portion of the core barrel 21, a lower core plate 27 is supported further on the upper side than the lower core support plate 25. The lower core plate 27 has a circular plate shape and a plurality of flow holes (not illustrated) are formed in the lower core plate 27. A reactor internal 28 is arranged in an area which is partitioned by the upper core plate 24 and the lower core plate 27 in the core barrel 21. The reactor internal 28 is constituted of a plurality of fuel assemblies 29 arranged in the area. Although not illustrated, the fuel assembly 29 is constituted by bundling a plurality of fuel rods in a lattice shape with a support grid. An upper nozzle is fixed to the upper end portion of the fuel assembly 29 and a lower nozzle is fixed to the lower end portion thereof. Furthermore, a plurality of control rods 30 are arranged in the reactor internal 28. The upper end portions of the control rods 30 of a predetermined number are grouped together and constitute a control rod cluster 31 and the control rods 30 can be inserted into the fuel assembly 29, that is, between a plurality of fuel rods.

A plurality of control rod cluster guide pipes 32 which pass through the upper core support plate 22 and extend in the vertical direction are fixed to the upper core support plate 22. The lower end portion of each control rod cluster guide pipe 32 is connected to the upper core plate 24 and the control rod cluster 31 can be inserted into the control rod cluster guide pipe 32.

The upper portion of the nuclear reactor vessel lid 13 has a hemispherical shape and a control rod driving mechanism 33 of a magnetic jack is arranged in the upper portion. The upper end portions of a plurality of control rod cluster guide pipes 32 extend to the inner side of the nuclear reactor vessel lid 13 and a control rod cluster driving shaft 34 extending downward from the control rod driving mechanism 33 passes through the nuclear reactor vessel lid 13 and is inserted into the control rod cluster guide pipe 32. The control rod cluster driving shaft 34 can be moved in the vertical direction by the control rod driving mechanism 33. Further, the control rod cluster driving shaft 34 passes through the control rod cluster guide pipe 32, extends to the reactor internal 28, and is connected to the control rod cluster 31. The control rod driving mechanism 33 controls the output of the nuclear reactor by inserting and extracting each control rod 30 of the control rod cluster 31 with respect to the reactor internal 28.

A plurality of instrumentation pipe nozzles 35 passing through the lower mirror 16 are provided in the nuclear reactor vessel body 12. An in-reactor instrumentation guide pipe 36 is connected to the in-reactor side upper end portion of each instrumentation pipe nozzle 35 and a conduit tube 37 is connected to the out-reactor side lower end portion of the instrumentation pipe nozzle 35. The upper end portion of each in-reactor instrumentation guide pipe 36 is connected to the lower core support plate 25 and a plurality of connecting plates 38 are mounted on the in-reactor instrumentation guide pipes 36 to prevent vibration. A thimble tube 39 passes through inside the conduit tube 37, the instrumentation pipe nozzle 35, and the in-reactor instrumentation guide pipe 36, passes through the lower core support plate 25 and the lower core plate 27, and is inserted into the reactor internal 28 (the fuel assembly 29). In addition, the thimble tube 39 is inserted into the conduit tube 37 and a cable for an instrument device is inserted into the thimble tube 39. A neutron flux detector is connected to the tip end portion of the cable for an instrument device and the neutron flux detector detects the neutron of the reactor internal 28.

An upper plenum 40 passing through the outlet nozzle 18 is provided on the upper side of the nuclear reactor vessel 11 with respect to the reactor internal 28 and a lower plenum 41 is provided on the lower side thereof. Furthermore, a downcomer portion 42 communicating with the inlet nozzle 17 and the lower plenum 41 is formed between the nuclear reactor vessel 11 and the core barrel 21. Therefore, light water flows from the inlet nozzle 17 to the nuclear reactor vessel 11, flows downward through the downcomer portion 42 and reaches the lower plenum 41. Then, the light water flows upward by being guided upward by the spherical inner surface of the lower plenum 41, passes through the lower core support plate 25 and the lower core plate 27, and flows into the reactor internal 28. The light water flowing into the reactor internal 28 absorbs the thermal energy generated from the fuel assembly 29 and cools the fuel assembly 29. Meanwhile, the light water becomes high temperature, passes through the upper core plate 24, flows upward to the upper plenum 40, and is discharged through the outlet nozzle 18.

In this case, the control rod driving mechanism 33 adjusts the inserted amount into the fuel assembly 29 by moving the control rod cluster 31 in the vertical direction, in such a manner that the nuclear fission in the reactor internal 28 is controlled. In other words, in the reactor internal 28, neutrons are emitted by the nuclear fission of the nuclear fuel constituting the fuel assembly 29 and the light water as moderator and primary cooling water reduces the kinetic energy of the emitted fast neutrons and makes the fast neutrons become thermal neutrons, in such a manner that new nuclear fission becomes easy to occur and cooling is performed by retrieving the generated heat. The number of neutrons generated in the reactor internal is adjusted by inserting the control rod 30 into the fuel assembly 29 and, further, the nuclear reactor can be urgently stopped by inserting the entirety of the control rod 30 to the lowermost portion of the fuel assembly 29.

In the pressurized water reactor 10 constituted as described above, the upper portion of the core barrel 21 is connected to the upper core plate 24, the lower portion of the core barrel 21 is connected to the lower core plate 27, and a plurality of fuel assemblies 29 are arranged inside the core barrel 21. The core barrel 21 is manufactured using a thick plate material having a predetermined thickness in order to prevent external leakage of radioactive rays or the likes from the fuel assembly 29.

Figure 1:
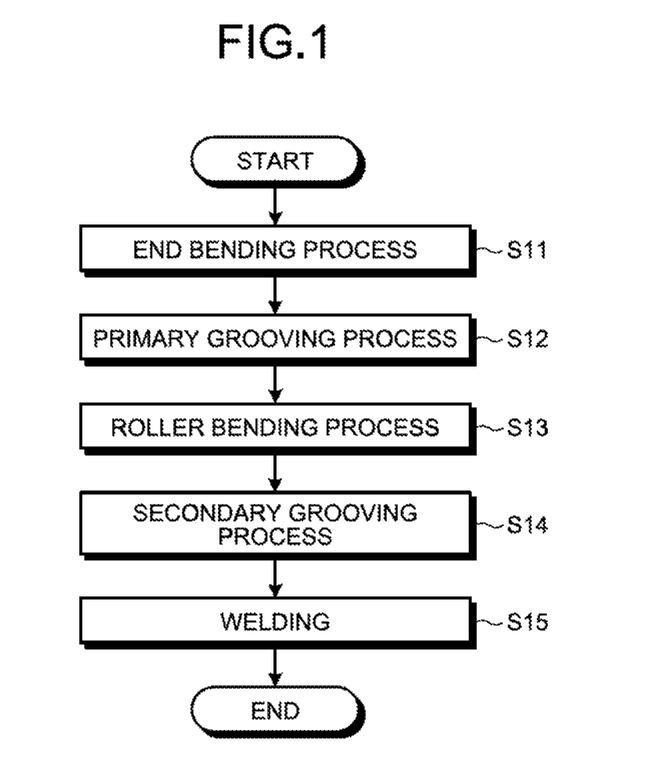
FIG. 1 is a manufacturing process flowchart illustrating a method for manufacturing a cylindrical member according to an embodiment.
Figure 2:
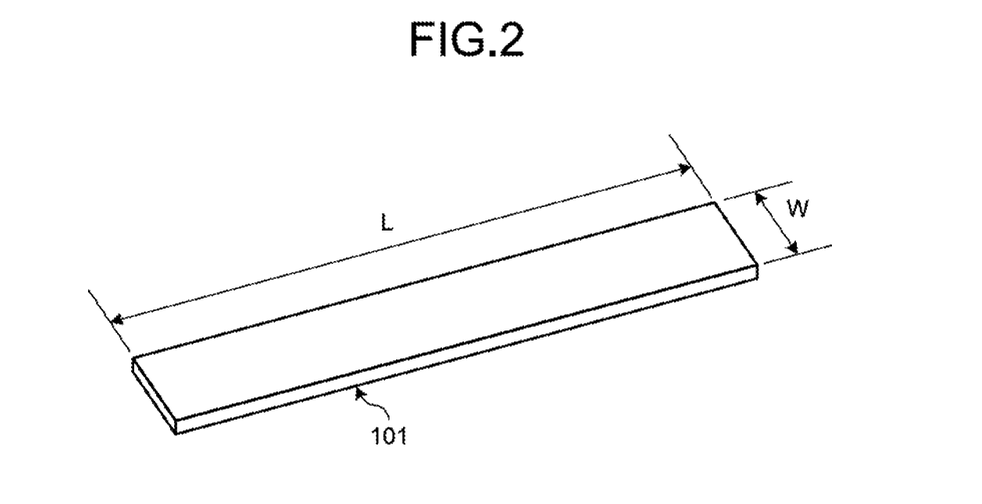
FIG. 2 is a perspective view of a thick plate material used as a material of a core barrel as the cylindrical member.
Figure 3:
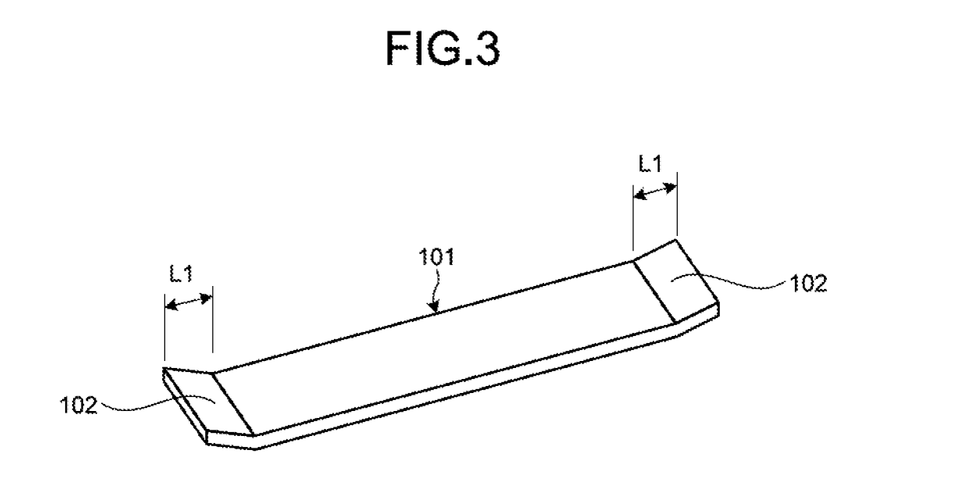
FIG. 3 is a perspective view of the thick plate material subjected to end bending.
Figure 4:
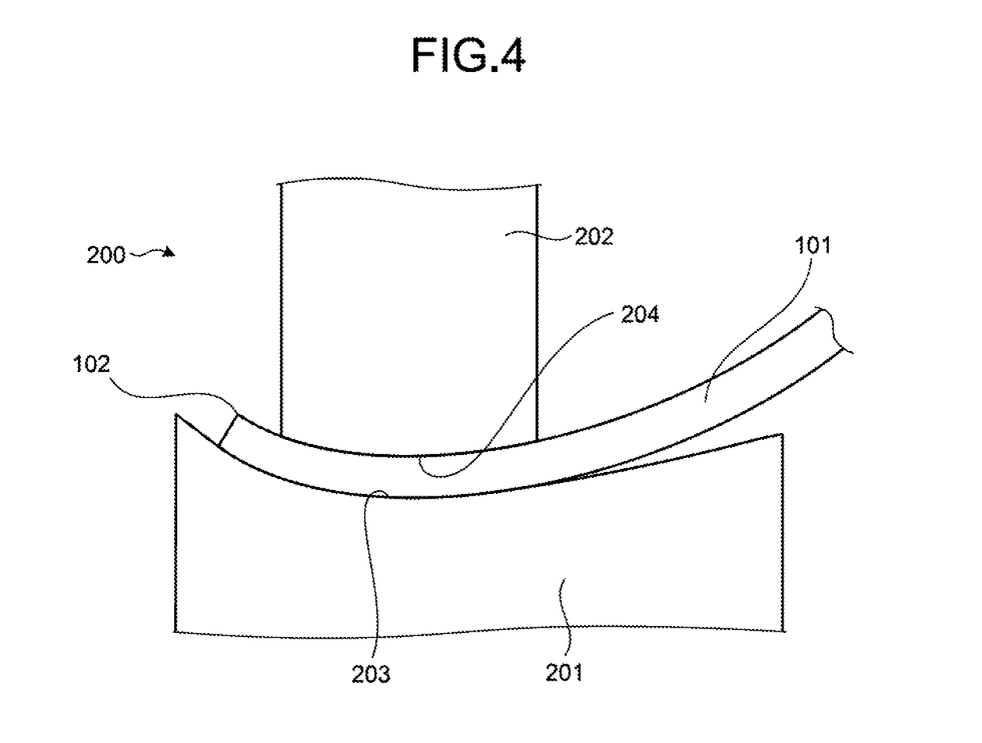
FIG. 4 is a schematic view for illustrating end bending of the thick plate material.
Figure 5:
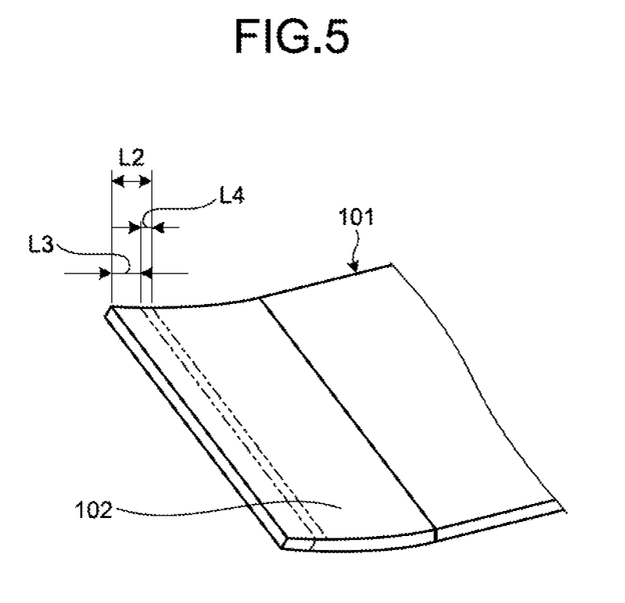
FIG. 5 is a perspective view illustrating an end portion of the thick plate material subjected to end bending.
Figure 6:
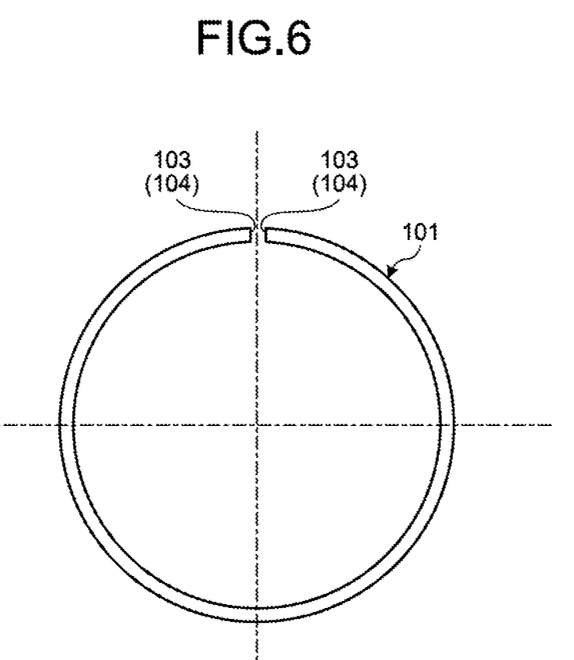
FIG. 6 is a schematic view of the thick plate material subjected to roller bending.
Figure 7:
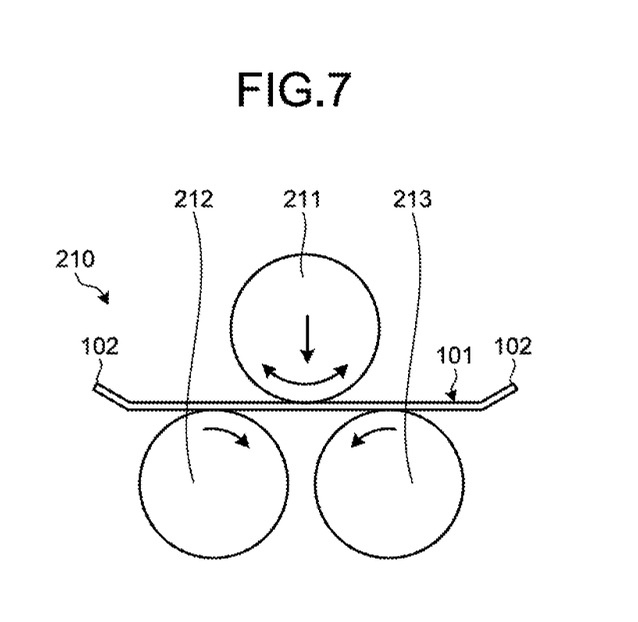
FIG. 7 is a schematic view for illustrating roller bending of the thick plate material.
Figure 8:
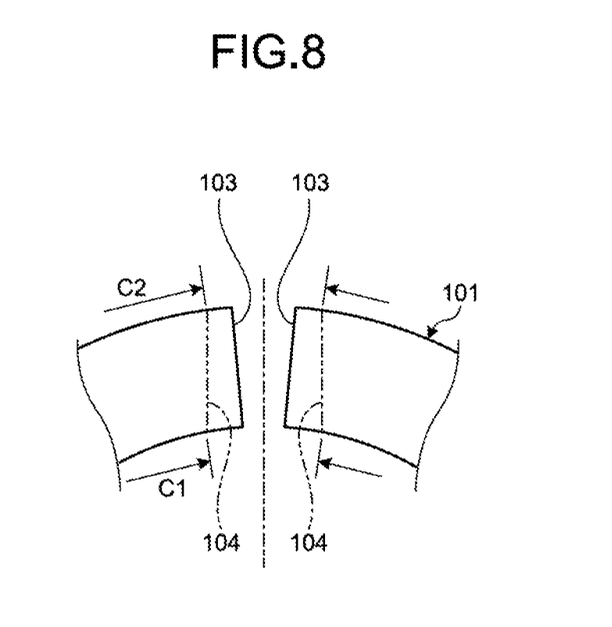
FIG. 8 is a schematic view illustrating an end portion of the thick plate material subjected to roller bending.
Figure 9:
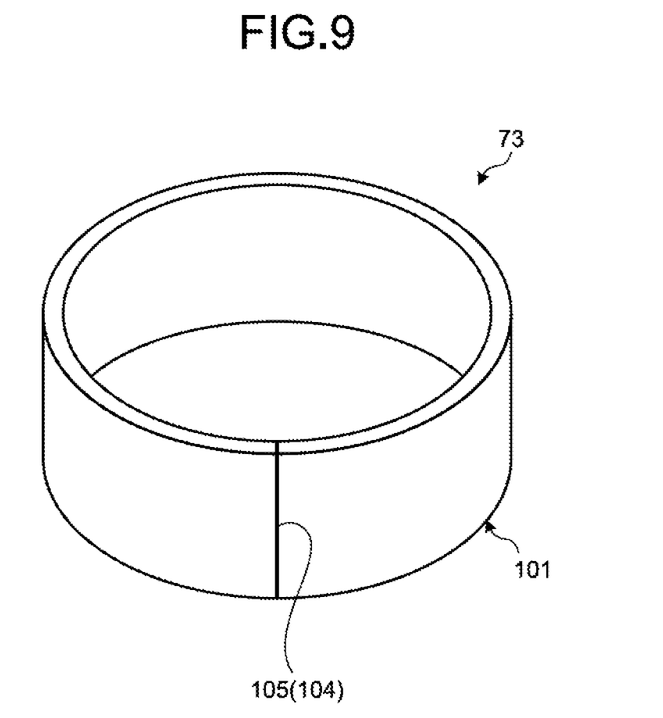
FIG. 9 is a perspective view of a cylindrical member manufactured by joining end portions by welding.

The method for manufacturing a cylindrical member according to the embodiment is applied to the core barrel 21 described above. Hereinafter, the method for manufacturing a cylindrical member according to the embodiment will be described. FIG. 1 is a manufacturing process flowchart illustrating a method for manufacturing a cylindrical member according to the embodiment. FIG. 2 is a perspective view of a thick plate material used as a material of a core barrel as the cylindrical member. FIG. 3 is a perspective view of the thick plate material subjected to end bending. FIG. 4 is a schematic view for illustrating end bending of the thick plate material. FIG. 5 is a perspective view illustrating an end portion of the thick plate material subjected to end bending. FIG. 6 is a schematic view of the thick plate material subjected to roller bending. FIG. 7 is a schematic view for illustrating roller bending of the thick plate material. FIG. 8 is a schematic view illustrating an end portion of the thick plate material subjected to roller bending. FIG. 9 is a perspective view of a cylindrical member manufactured by joining end portions by welding.

The method for manufacturing a cylindrical member according to the embodiment has a process for performing end bending on respective end portions of the plate material in the longitudinal direction, a process for performing primary grooving on respective end surfaces of the plate material subjected to end bending, a process for bending the plate material in a ring shape, a process for performing secondary grooving on the respective end surfaces of the plate material subjected to bending in a ring shape, and a process for joining the end portions of the plate material.

In this case, in primary grooving, each end surface of the plate material subjected to end bending is removed by a predetermined length. Secondary grooving processes the plate material such that the end surfaces of the plate material are parallel to each other. In this case, secondary grooving processes the plate material on the basis of the inner circumference length and the outer circumference length of the plate material subjected to bending in a ring shape such that the end surfaces of the plate material are parallel to each other. Electron beam welding is applied to join the end portions of the plate material.

Hereinafter, the detail of the method for manufacturing a cylindrical member according to the embodiment will be described.

In the method for manufacturing a cylindrical member according to the embodiment, a plate material 101 has a predetermined length L, a predetermined width W, and a constant thickness, as illustrated in FIG. 2. The plate material 101 is set in accordance with the core barrel 21 to be manufactured. In this case, the plate material 101 is a thick plate and, generally, a plate which is called a thick plate has a thickness of equal to or more than 30 mm. As illustrated in FIG. 1, in Step S11, end bending is performed on respective end portions of one plate material 101 in the longitudinal direction. In other words, as illustrated in FIG. 3, bending is performed on the plate material 101 from each end surface to a position separate by a predetermined length L1 toward a middle portion in the longitudinal direction such that the plate material 101 has an arc shape, in such a manner that an end bending portion 102 is formed.

Specifically, as illustrated in FIG. 4, a press processing device 200 has a lower mold 201 and an upper mold 202. A recess portion 203 is formed in the lower mold 201 and a convex portion 204 is formed in the upper mold 202. Therefore, the plate material 101 is set on the lower mold 201 and the upper mold 202 is lowered, and then the convex portion 204 is fitted to the recess portion 203. Thus, the end portions of the plate material 101 are bent and the end bending portions 102 are formed.

Returning to FIG. 1, in Step S12, primary grooving is performed on each end surface of the plate material 101 subjected to end bending. In primary grooving, each end surface of the plate material 101 subjected to end bending is removed by a predetermined length. In other words, as illustrated in FIG. 5, a preliminary length L2 is secured in each end portion side of the plate material 101 in advance. Further, in primary grooving, the plate material 101 is cut by a predetermined length L3 of the preliminary length L2, and thus the remaining length is as long as a length L4.

Returning to FIG. 1, in Step S13, bending is performed on the plate material 101 so as to have a ring shape. In other words, as illustrated in FIG. 6, the plate material 101 is subjected to roll bending over the entire length, in such a manner that the plate material 101 has a ring shape.

Specifically, as illustrated in FIG. 7, a roller bending device 210 has a configuration substantially similar to that of the press processing device 200 and has one upper roller 211 and two lower rollers 212 and 213. Roller bending is performed by inserting the plate material 101 to a portion between the upper roller 211 and the lower rollers 212 and 213. In other words, the respective rollers 211, 212, and 213 are driven to rotate in arrow directions in a state where the plate material 101 is inserted to a portion between the upper roller 211 and the lower rollers 212 and 213. Therefore, the upper roller 211 rotates back and forth at a predetermined angle, and thus the plate material 101 is pressed downward to a portion between the lower rollers 212 and 213. Then, finally, the plate material 101 is wound around the outer peripheral surface of the upper roller 211 and is formed in a ring shape, as illustrated in FIG. 6.

Returning to FIG. 1, in Step S14, secondary grooving is performed on each end surface of the plate material 101 subjected to bending in a ring shape. In secondary grooving, the plate material 101 is processed such that the end surfaces of the plate material 101 are parallel to each other.

In other words, as illustrated in FIG. 8, an end surface 103 is formed in the plate material 101 having a ring shape by primary grooving. However, there is a possibility that the end surfaces 103 are not parallel to each other. Therefore, secondary grooving is performed on the end surface 103 of the plate material 101 and each end portion is removed by a predetermined length from the end surface 103, and thus end surfaces 104 parallel to each other are formed. In this case, the thickness, the inner diameter, the outer diameter of the core barrel 21 are set from the design data and secondary grooving processes the plate material 101 subjected to bending in a ring shape on the basis of the inner circumference length C1 and the outer circumference length C2 based on the design data such that the end surfaces 104 of the plate material 101 are parallel to each other. In addition, "the end surfaces 104 of the plate material 101 are parallel to each other" means that the end surfaces 104 are parallel to each other when the end surfaces 104 are in close contact with each other.

Returning to FIG. 1, in Step S15, the end surfaces 104 of the plate material 101 which is processed to have a ring shape and of which the end surfaces are subjected to secondary grooving are joined to each other. In this case, an electron beam welding device is used as a welding device for joining the end surfaces of the plate material 101. In other words, as illustrated in FIG. 9, the end surfaces 104 of the plate material 101 processed in a ring shape are fixed in a state where the end surfaces 104 are in close contact with each other and the electron beam is emitted to a position where the end surfaces 104 are in close contact with each other, in such a manner that the end surfaces 104 are joined by forming a welding portion 105.

The method for manufacturing a cylindrical member according to the embodiment has a process for performing end bending on the end portions of the plate material 101 in the longitudinal direction, a process for performing primary grooving on the end surfaces of the plate material 101 subjected to end bending, a process for bending the plate material 101 in a ring shape, a process for performing secondary grooving on the respective end surfaces 103 (104) of the plate material 101 subjected to bending in a ring shape, and a process for joining the end surfaces 104 of the plate material 101.

Therefore, first, the end bending portion 102 is formed in each end portion of the plate material 101 and primary grooving is performed on each end surface. Next, roll bending is performed on the plate material 101 so as to have a ring shape and secondary grooving is performed on each end surface 103 (104). Then, the end surfaces 104 of the plate material 101 are joined to each other. Therefore, the length of the plate material 101 is adjusted by primary grooving and the degree of parallelization of each end surface 104 is adjusted by secondary grooving, and thus the end surfaces 104 of the plate material 101 can be appropriately joined to each other. As a result, the deformation of the each end surface is prevented and the end surfaces can be highly accurately joined to each other in the plate material 101, and thus the core barrel 21 as a high-quality cylindrical member can be manufactured.

In the method for manufacturing a cylindrical member according to the embodiment, each end surface of the end bending portion 102 of the plate material 101 subjected to end bending is removed by a predetermined length in primary grooving. Generally, a preliminary length is secured for the plate material 101 and it is possible to easily adjust the length of the plate material 101 by removing each end surface of the plate material 101 by a predetermined length through primary grooving.

In the method for manufacturing a cylindrical member according to the embodiment, the end surfaces 104 parallel to each other are formed in secondary grooving by processing the respective end surfaces 103 of the plate material 101. Therefore, since the respective end surfaces 103 (104) of the plate material 101 are parallelized by secondary grooving after bending is performed, the end surfaces 104 of the plate material 101 can be highly accurately joined to each other.

In the method for manufacturing a cylindrical member according to the embodiment, the respective end surfaces 103 (104) of the plate material 101 subjected to bending in a ring shape are processed to be parallel in secondary grooving on the basis of the inner circumference length C1 and the outer circumference length C2 of the plate material 101. Therefore, it is possible to perform highly accurate secondary grooving.

In the method for manufacturing a cylindrical member according to the embodiment, the respective end surfaces 104 of the plate material 101 are joined by electron beam welding. Therefore, welding can be performed to a deep position in a narrow range in the vicinity of the joining portion of the plate material 101, and thus it is possible to reduce the welding distortion and perform highly accurate joining of the plate material 101.

Furthermore, in the embodiment described above, an electron beam welding (EBW) device is used as a welding device. However, it is not limited thereto.

In the embodiment described above, the core barrel 21 is applied as a cylindrical member manufactured by the method for manufacturing a cylindrical member. However, it is not limited thereto.

REFERENCE SIGNS LIST

21 CORE BARREL (CYLINDRICAL MEMBER)
101 PLATE MATERIAL
102 END BENDING PORTION
103, 104 END SURFACE
105 WELDING PORTION

The invention claimed is:

1. A method for manufacturing a cylindrical member comprising:
    end bending a first end portion and a second end portion of a plate material to form a first end bending portion in which a length in a first direction is equal to or longer than a preliminary length in the first end portion and a second end bending portion in which a length in the first direction is equal to or longer than the preliminary length in the second end portion wherein the plate material extends in the first direction and includes the first end portion and the second end portion which are opposed to each other in the first direction;
    primary grooving each of the first end bending portion and the second end bending portion to remove each of the first end bending portion and the second end bending portion by a predetermined length of the preliminary length in the first direction while leaving extra length;
    bending the plate material over an entire length along the first direction, in such a manner that the plate material has a ring shape;
    secondary grooving each of the first end bending portion and the second end bending portion of the plate material having the ring shape; and
    joining the first end bending portion and the second end bending portion to manufacture the cylindrical member.

2. The method for manufacturing a cylindrical member according to claim 1, wherein a first end surface of the first end bending portion and a second end surface of the second end bending portion which are opposed each other are processed to be parallel in the secondary grooving.

3. The method for manufacturing a cylindrical member according to claim 2, wherein the first end surface and the second end surface are processed to be parallel on the basis of an inner circumference length and an outer circumference length of the plate material having the ring shape, in the secondary grooving.

4. The method for manufacturing a cylindrical member according to claim 1, wherein the joining is performed in such a manner that the first end bending portion and the second end bending portion are joined by electron beam welding.

* * * * *